(12) United States Patent
Rajesh et al.

(10) Patent No.: US 11,455,146 B2
(45) Date of Patent: Sep. 27, 2022

(54) GENERATING A PSEUDO-CODE FROM A TEXT SUMMARIZATION BASED ON A CONVOLUTIONAL NEURAL NETWORK

(71) Applicant: Bank of America Corporation, Charlotte, NC (US)

(72) Inventors: MadhuMathi Rajesh, Chennai (IN); MadhuSudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 219 days.

(21) Appl. No.: 16/907,568

(22) Filed: Jun. 22, 2020

(65) Prior Publication Data

US 2021/0397416 A1    Dec. 23, 2021

(51) Int. Cl.
   *G06F 8/30*   (2018.01)
   *G06N 3/04*   (2006.01)
   (Continued)

(52) U.S. Cl.
   CPC ............ *G06F 8/30* (2013.01); *G06F 40/279* (2020.01); *G06F 40/30* (2020.01); *G06F 40/58* (2020.01); *G06N 3/04* (2013.01); *G06N 3/08* (2013.01)

(58) Field of Classification Search
   CPC .......... G06F 8/30; G06F 40/279; G06F 40/58; G06F 40/30; G06N 3/04; G06N 3/08
   (Continued)

(56) References Cited

U.S. PATENT DOCUMENTS 9,697,416 B2   7/2017   Shen et al.
9,804,946 B2   10/2017  Conlon et al.
(Continued)

OTHER PUBLICATIONS

Yuan et al, "Incorporating word attention with convolutional neural networks for abstractive summarization", [Online], 2019, pp. 267-287, [Retrieved from interneton Mar. 4, 2022], < https://link.springer.com/article/10.1007/s11280-019-00709-6 > (Year: 2019).*
(Continued)

*Primary Examiner* — Ziaul A Chowdhury
*Assistant Examiner* — Zengpu Wei
(74) *Attorney, Agent, or Firm* — Banner & Witcoff, Ltd.

(57) ABSTRACT

Aspects of the disclosure relate to generating a pseudo-code from a text summarization based on a convolutional neural network. A computing platform may receive, by a computing device, a first document comprising text in a natural language different from English. Subsequently, the computing platform may translate, based on a neural machine translation model, the first document to a second document comprising text in English. Then, the computing platform may generate an attention-based convolutional neural network (CNN) for the second document. Then, the computing platform may extract, by applying the attention-based CNN, an abstractive summary of the second document. Subsequently, the computing platform may generate, based on the abstractive summary, a flowchart. Then, the computing platform may generate, based on the flowchart, a pseudo-code. Subsequently, the computing platform may display, via an interactive graphical user interface, the flowchart, and the pseudo-code.

18 Claims, 6 Drawing Sheets

(51) Int. Cl.
*G06F 40/279* (2020.01)
*G06F 40/58* (2020.01)
*G06F 40/30* (2020.01)
*G06N 3/08* (2006.01)

(58) Field of Classification Search
USPC .................................................. 717/109
See application file for complete search history.

(56) References Cited

U.S. PATENT DOCUMENTS

| | | | |
|---|---|---|---|
| 10,133,739 | B2 | 11/2018 | Le et al. |
| 10,467,500 | B1* | 11/2019 | Bao ................... G06K 9/6232 |
| 10,552,121 | B1* | 2/2020 | Ganeshmani .......... G06F 8/443 |
| 11,126,405 | B1* | 9/2021 | Pasic ................... G06F 40/216 |
| 2013/0197896 | A1* | 8/2013 | Chalabi ............... G06F 40/268 704/2 |
| 2015/0339269 | A1* | 11/2015 | Konchitsky ........... G06F 40/106 715/211 |
| 2018/0129937 | A1 | 5/2018 | Bradbury et al. |
| 2019/0385004 | A1* | 12/2019 | Jiang ................... G06N 3/0454 |
| 2020/0074515 | A1* | 3/2020 | Ghatage ................ G06N 20/00 |
| 2020/0117715 | A1* | 4/2020 | Lee ...................... G06N 3/088 |
| 2020/0135227 | A1 | 4/2020 | Sainath et al. |
| 2020/0174756 | A1* | 6/2020 | Cerar ...................... G06F 8/70 |
| 2020/0286112 | A1* | 9/2020 | Zhou ................... G06N 20/00 |
| 2020/0387531 | A1* | 12/2020 | Agnihotram ........ G06F 16/3344 |
| 2021/0174513 | A1* | 6/2021 | Chidlovskii ......... G06N 3/0454 |
| 2021/0232873 | A1* | 7/2021 | Kothari ................ G06K 9/6271 |

OTHER PUBLICATIONS

Fu et al, "ATNet: Answering Cloze-Style Questions via Intra-attention and Inter-attention", [Online], 2019, pp. 242-252, [Retrieved from internet on Mar. 4, 2022], <https://link.springer.com/content/pdf/10.1007%2F978-3-030-16145-3_19.pdf> (Year: 2019).*

Shi et al, "Cascade Attention: Multiple Feature Based Learning for Image Captioning", [Online], 2019, pp. 1970-1974, [Retrieved from internet on Mar. 14, 2022] (Year: 2019).*

Shen et al, "Attention-Based Convolutional Neural Network for Semantic Relation Extraction", [Online], 2016, pp. 2526-2536, [Retrieved from internet on Mar. 14, 2022], <https://aclanthology.org/C16-1238.pdf> (Year: 2016).*

Yang et al, "Fine-grained Pseudo-code Generation Method via Code Feature Extraction and Transformer", 2021, [Online], pp. 1-10, [Retrieved from interneton May 26, 2022], <https://arxiv.org/pdf/2102.06360.pdf> (Year: 2021).*

Convolutional Neural Network Wikipedia 29 pages, Jun. 14, 2020.

Convolutional Neural Network Architecture: Forging Pathways to the Future Convolutional Neural Networks missinglink.ai 12 pages, downloaded Jun. 15, 2020.

Language Model Wikipedia 6 pages, Jun. 11, 2020.

Long Short-Term Memory Wikipedia 13 pages, May 27, 2020.

* cited by examiner

GENERATING A PSEUDO-CODE FROM A TEXT SUMMARIZATION BASED ON A CONVOLUTIONAL NEURAL NETWORK

BACKGROUND

Aspects of the disclosure relate to deploying digital data processing systems to generate a pseudo-code for a process flow. In particular, one or more aspects of the disclosure relate to generating a pseudo-code from a text summarization based on a convolutional neural network.

Process flow mapping, also generally known as flow-charting, or process diagramming, is a tool that may be utilized to illustrate an association between activities within processes, such as, for example, processes of business operations. Process flow maps may include various geometrical shaped objects representing steps (e.g., decisions, activities) in a process, along with arrows and/or lines that represent inter-relationships between the steps. Process flow maps, or flowcharts, may enable a better understanding of steps involved in a work flow, and a visual diagram of the process maps may facilitate designing, implementing, and/or managing activities.

In some instances, a document may include text in a natural language different from English, and may need to be translated to English, and then an abstract may be extracted to identify steps in a process flow. Ensuring accuracy of the translation, and ensuring that significant aspects of the document are included in a summary, may be highly advantageous to providing a reliable process flow, and generating a pseudo-code based on the process flow. In many instances, however, it may be difficult to perform such steps with speed and accuracy, while also attempting to optimize network resources, bandwidth utilization, and efficient operations of the associated computing infrastructure.

SUMMARY

Aspects of the disclosure provide effective, efficient, scalable, fast, reliable, and convenient technical solutions that address and overcome the technical problems associated with generating a pseudo-code from a text summarization based on a convolutional neural network.

In accordance with one or more embodiments, a computing platform having at least one processor, and memory storing computer-readable instructions that, when executed by the at least one processor, cause the computing platform to receive, by a computing device, a first document comprising text in a natural language different from English. Subsequently, the computing platform may translate, based on a neural machine translation model, the first document to a second document comprising text in English. Then, the computing platform may generate an attention-based convolutional neural network (CNN) for the second document. Then, the computing platform may extract, by applying the attention-based CNN, an abstractive summary of the second document. Subsequently, the computing platform may generate, based on the abstractive summary, a flowchart. Then, the computing platform may generate, based on the flowchart, a pseudo-code. Subsequently, the computing platform may display, via an interactive graphical user interface, the flowchart and the pseudo-code.

In some embodiments, the computing platform may convert, based on a cascade image generation model, the abstractive summary to the flowchart.

In some embodiments, the computing platform may generate, based on a natural language generation model, the pseudo-code in a programming language associated with a domain.

In some embodiments, the computing platform may generate a word attention net comprising features of one or more words of an encoder portion. Then, the computing platform may generate a group attention net including output of the word attention net and one or more group encoders, where the group encoder includes one or more groups of the one or more words. Then, the computing platform may generate an intra attention net, of the encoder portion, comprising outputs of word attention nets and group attention nets. Subsequently, the computing platform may generate an inter attention net comprising outputs of the intra attention net of the encoder portion, and an intra attention net of the decoder portion.

In some embodiments, the attention-based CNN may include an encoder portion, a group, of one or more groups, of words in the encoder portion, and the computing platform may determine a word-level attention score for a word of the group based on a word-level attention score for the group.

In some embodiments, the attention-based CNN may include an encoder portion, a first group and a second group, of one or more groups, of words in the encoder portion, and the computing platform may determine a word-to-group-level attention score for a word of the first group based on a word-level attention score for the second group.

In some embodiments, the attention-based CNN may include an encoder portion, a group, of one or more groups, of words in the encoder portion, and the computing platform may determine a group-level attention score for a word of the group based on a group-level attention score for the group.

In some embodiments, the attention-based CNN may include an encoder portion, a group, of one or more groups, of words in the encoder portion, a group attention net including output of the word attention nets and one or more group encoders, where the group encoder includes one or more groups of words, a word attention net comprising features of the words in the encoder portion, and an intra attention net comprising word attention nets and group attention nets, and. the computing platform may determine an intra-attention score for a word of the group based on a group-level attention score for the word, and a word-to-group-level attention score for the word.

In some embodiments, the attention-based CNN may include an encoder portion and a decoder portion, and the computing platform may generate a first context vector for the encoder portion based on a first weighted sum of first feature vectors for the encoder portion, where the first weights are based on intra-attention scores for words in the encoder portion. Subsequently, the computing platform may generate a second context vector for the decoder portion based on a second weighted sum of second feature vectors for the decoder portion, where the second weights are based on intra-attention scores for words in the decoder portion.

In some embodiments, the attention-based CNN may include an inter-attention net comprising one or more intra-attention nets, and the computing platform may determine an inter-attention score based on the first context vector and the second context vector.

In some embodiments, the computing platform may generate a vocabulary distribution based on word attention nets and intra attention nets.

In some embodiments, the attention-based CNN may include an encoder portion and a decoder portion, and an inter-attention net comprising one or more intra-attention nets, and the computing platform may determine an output of the attention-based CNN based on a vocabulary distribution, an inter-attention score, an intra-attention score for the encoder portion, and an inter-attention score for the decoder portion.

In some embodiments, the computing platform may extract the abstractive summary by analyzing one or more of: repetitions of words and out-of-vocabulary words.

In some embodiments, the computing platform may train the neural machine translation model.

In some embodiments, the computing platform may train a cascade image generation model.

In some embodiments, the computing platform may train a natural language generation model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Organizations may generate business processes, such as, for example, plans, frameworks, outlines, templates, strategic roadmaps, and so forth. Generally, business activities may be summarized in high-level work flows. In some instances, the workflows may include details. Also, for example, log files may be generated to record activities performed in a computing environment. Such processes, workflows, log reports, and so forth, may be in a language different from English, and may need to be translated to English. Accordingly, ensuring a high level of accuracy of the translation may be of high significance. Also, for example, for documents in English, it may be challenging to generate summaries with a high degree of accuracy.

In many instances, processes, workflows, log reports, and so forth, may be better visualized when presented as a flowchart. Also, for example, for a process to be converted to an executable computer program, it may be preferable to generate a pseudo-code for the process. Such a pseudo-code may be generated, for example, from the flowchart. Accordingly, generating a summary of a document with a high level of accuracy may be of high significance, as such accuracy of the summary may impact the pseudo-code and/or flowchart.

Accordingly, it may be of high significance for an enterprise organization to devise ways in which to automatically convert a document from a natural language to English, generate a summary of the translated document, and generate flowcharts and pseudo-codes based on a process described in the document.

Some aspects of the disclosure relate to a deeper contextual understanding of textual content, generating a non-repetitive abstractive summary, generating flowcharts, and/or generating domain-specific language pseudocodes. In particular, a computer architecture comprising inter-attention nets and intra-attention nets may be designed as a building block of an encoder-decoder model to generate a summary from the document.

Figure 1A:
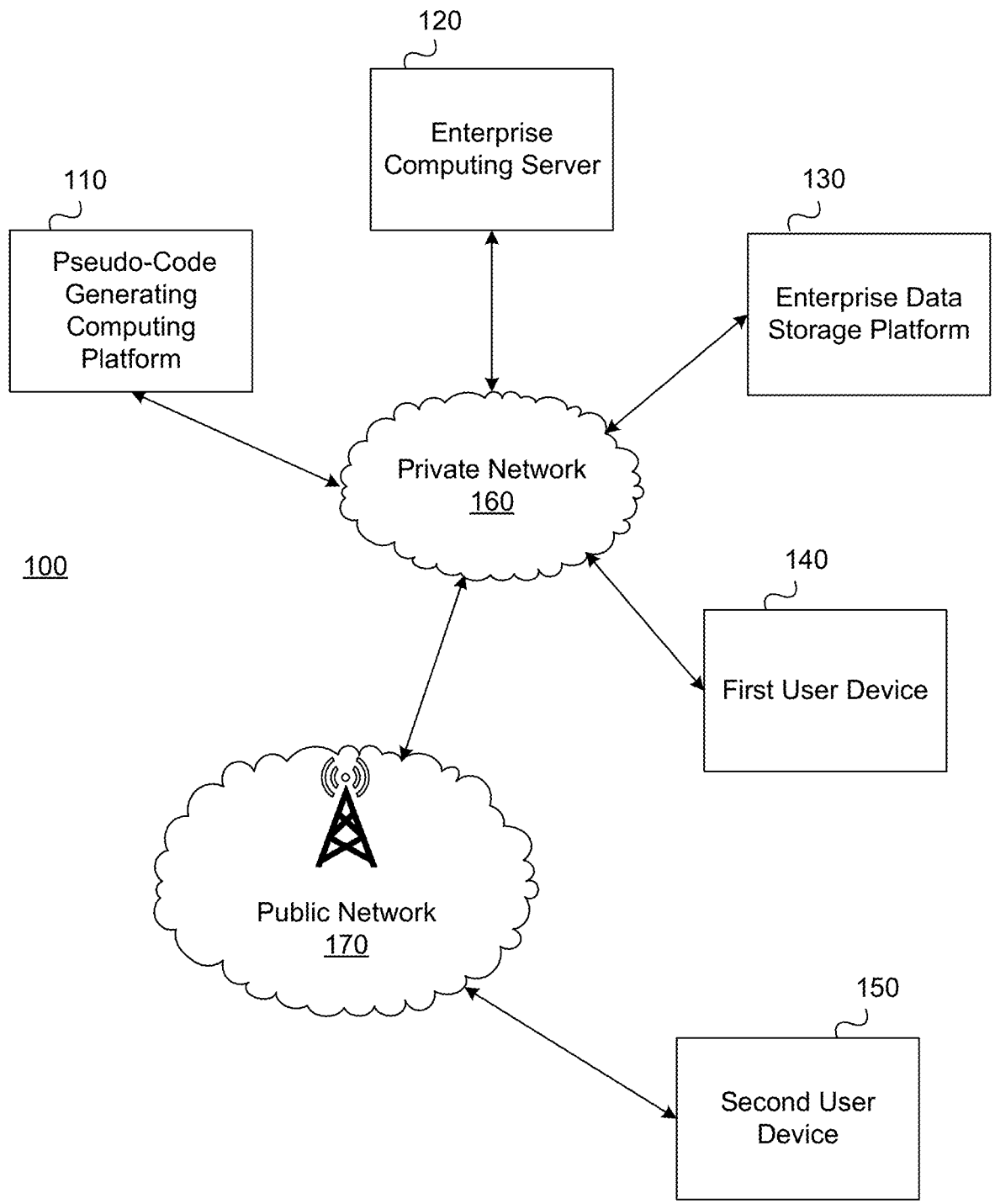
FIGS. 1A and 1B depict an illustrative computing environment for generating a pseudo-code from a text summarization based on a convolutional neural network.
Figure 1B:
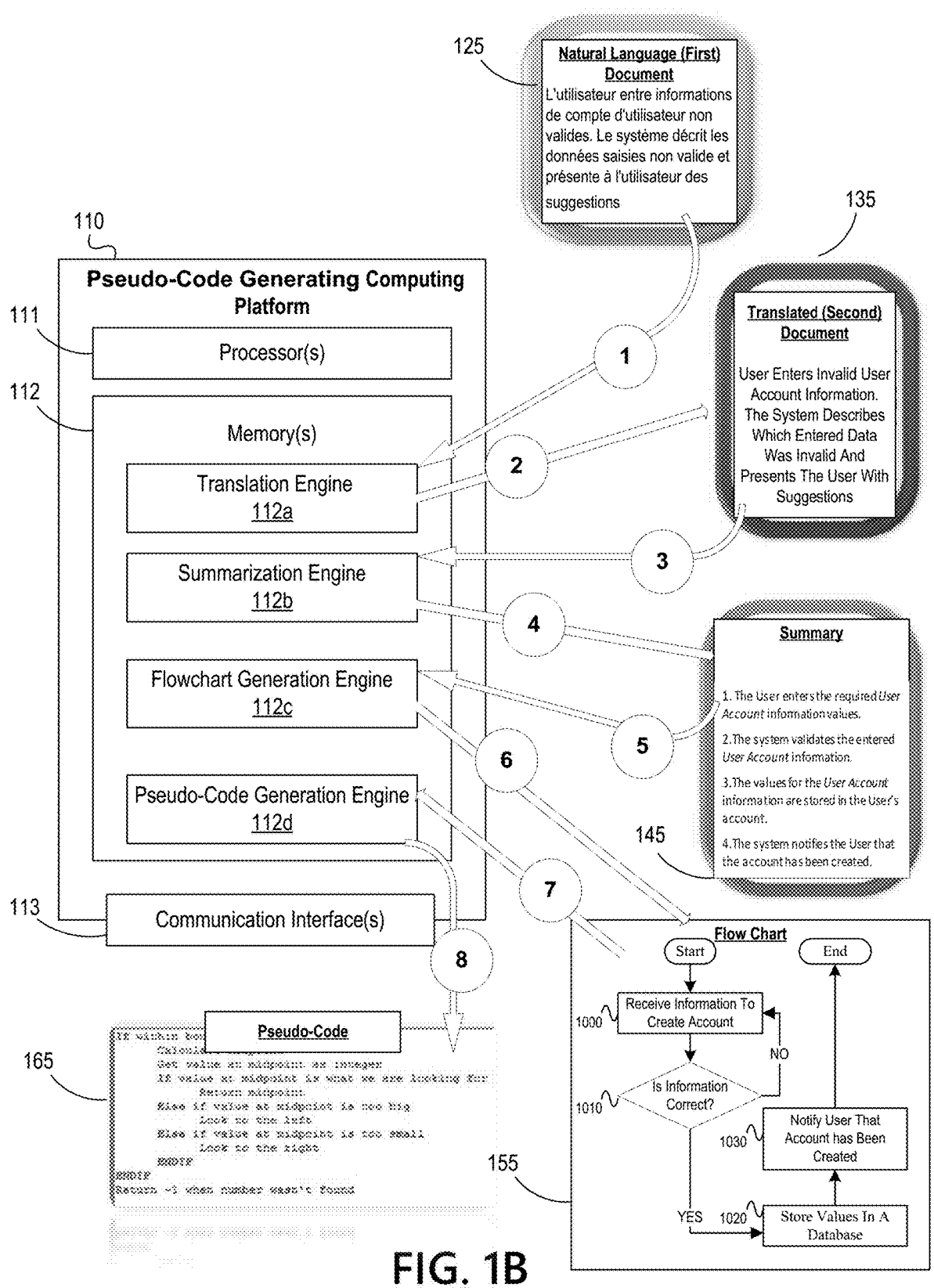

FIGS. 1A and 1B depict an illustrative computing environment for an automated and adaptive validation of a user interface. Referring to FIG. 1A, computing environment 100 may include one or more computer systems. For example, computing environment 100 may include a pseudo-code generating computing platform 110, enterprise computing server 120, an enterprise data storage platform 130, first user device 140, and second user device 150.

As illustrated in greater detail below, pseudo-code generating computing platform 110 may include one or more computing devices configured to perform one or more of the functions described herein. For example, pseudo-code generating computing platform 110 may include one or more computers (e.g., laptop computers, desktop computers, servers, server blades, or the like) and/or other computer components (e.g., processors, memories, communication interfaces).

Enterprise computing server 120 may include one or more computing devices and/or other computer components (e.g., processors, memories, communication interfaces). In addition, enterprise computing server 120 may be configured to host, execute, and/or otherwise provide one or more applications. For example, enterprise computing server 120 may be configured to host, execute, and/or otherwise provide one or more applications, security applications, human resource applications, travel scheduling applications, meeting coordination applications, and/or other applications associated with an enterprise organization. In some instances, enterprise computing server 120 may be configured to provide various enterprise and/or back-office computing functions for an enterprise organization. For example, enterprise computing server 120 may include various servers and/or databases that store and/or otherwise maintain business information, information associated with business processes, and so forth. In addition, enterprise computing server 120 may process and/or otherwise execute actions based on scripts, commands and/or other information received from other computer systems included in computing environment 100. Additionally or alternatively, enterprise computing server 120 may receive instructions from pseudo-code generating computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, business rules, flowcharts, computer programs, pseudo-codes, business processes, documents, summaries of documents, data on enterprise resources, and so forth. Additionally or alternatively, enterprise computing server 120 may load data from enterprise data storage platform 130, manipulate and/or otherwise process such data, and return modified data and/or other data to enterprise data storage platform 130 and/or to other computer systems included in computing environment 100.

First user device 140 may be a personal computing device (e.g., desktop computer, laptop computer) or mobile computing device (e.g., smartphone, tablet, wearable device). In addition, first user device 140 may be linked to and/or used by a specific user (who may, e.g., be a customer of an organization operating pseudo-code generating computing platform 110). Also, for example, user of first user device 140 may utilize first user device 140 to review flowcharts and/or pseudo-codes.

Second user device 150 may be a personal computing device (e.g., desktop computer, laptop computer) or mobile computing device (e.g., smartphone, tablet, wearable device), that may be a source of information. Also, for example, user of second user device 150 may utilize second user device 150 to review flowcharts and/or pseudo-codes.

Computing environment 100 also may include one or more networks, which may interconnect one or more of pseudo-code generating computing platform 110, enterprise computing server 120, enterprise data storage platform 130, first user device 140, and/or second user device 150. For example, computing environment 100 may include a private network 160 (which may, e.g., interconnect pseudo-code generating computing platform 110, enterprise computing server 120, enterprise data storage platform 130, first user device 140, and/or one or more other systems which may be associated with an organization, and public network 170 (which may, e.g., interconnect first user device 140 with private network 160 and/or one or more other systems, public networks, sub-networks, and/or the like). Public network 170 may be a cellular network, including a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., interconnect first user device 140 and one or more other devices with each other).

In one or more arrangements, enterprise computing server 120, enterprise data storage platform 130, first user device 140, and/or second user device 150, and/or the other systems included in computing environment 100 may be any type of computing device capable of receiving input via a user interface, and communicating the received input to one or more other computing devices. For example, enterprise computing server 120, enterprise data storage platform 130, first user device 140, and/or second user device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of pseudo-code generating computing platform 110, enterprise computing server 120, enterprise data storage platform 130, first user device 140, and/or second user device 150, may, in some instances, be special-purpose computing devices configured to perform specific functions.

Referring to FIG. 1B, pseudo-code generating computing platform 110 may include one or more processors 111, memory 112, and communication interface 113. A data bus may interconnect processor 111, memory 112, and communication interface 113. Communication interface 113 may be a network interface configured to support communication between pseudo-code generating computing platform 110 and one or more networks (e.g., network 160, network 170, a local network, or the like). Memory 112 may include one or more program modules having instructions that when executed by processor 111 cause pseudo-code generating computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of pseudo-code generating computing platform 110 and/or by different computing devices that may form and/or otherwise make up pseudo-code generating computing platform 110. For example, memory 112 may have, store, and/or include a translation engine 112a, a summarization engine 112b, a flowchart generation engine 112c, and a pseudo-code generation engine 112d. Translation engine 112a may have instructions that direct and/or cause pseudo-code generating computing platform 110 to receive, by a computing device, a first document comprising text in a natural language different from English. In some embodiments, translation engine 112a may have instructions that direct and/or cause pseudo-code generating computing platform 110 to translate, based on a neural machine translation model, the first document to a second document comprising text in English. Summarization engine 112b may have instructions that direct and/or cause pseudo-code generating computing platform 110 to generate an attention-based convolutional neural network (CNN) for the second document. In some embodiments, summarization engine 112b may have instructions that direct and/or cause pseudo-code generating computing platform 110 to extract, by applying the attention-based CNN, an abstractive summary of the second document. Flowchart generation engine 112c may have instructions that direct and/or cause pseudo-code generating computing platform 110 to generate, based on the abstractive summary, a flowchart. Pseudo-code generation engine 112d may have instructions that direct and/or cause pseudo-code generating computing platform 110 to generate, based on the flowchart, a pseudo-code. In some embodiments, pseudo-code generation engine 112d may have instructions that direct and/or cause pseudo-code generating computing platform 110 to display, via an interactive graphical user interface, the flowchart, and the pseudo-code.

Referring to FIG. 1B, at step 1, pseudo-code generating computing platform 110 may receive, by a computing device, a first document 125 including text in a natural language different from English. For example, first document 125 may be a document describing a business process. For example, first document 125 may describe a workflow for a business project. Also, for example, first document 125 may be a log file for a task (e.g., a bug-fix, a test in the testing environment, an update in the production environment) describing steps performed to complete the task. As another example, first document 125 may be a document describing changes included in a new release for a software. In some embodiments, first document 125 may include text in a natural language different from English, such as, for example, French, German, Spanish, and so forth. For example, first document 125 may be a document with text in the French language, such as, for example, "L'utilisateur entre informations de compte d'utilisateur non valides. Le système décrit les données saisies non valide et présente à l'utilisateur des suggestions."

At step 2, pseudo-code generating computing platform 110 may translate, based on a neural machine translation model, the first document 125 to a second document 135 including text in English. Generally, pseudo-code generating computing platform 110 may utilize a natural language processing tool to translate first document 125. In general, the language processing tool may be configured to learn contextual relations between words and/or phrases in a text. For example, the natural language processing tool may be a neural machine translation model, such as, for example, a Bidirectional Encoder Representations from Transformers ("BERT") model. In some embodiments, pseudo-code generating computing platform 110 may train the neural machine translation model. For example, pseudo-code generating computing platform 110 may pre-train transformers of the BERT model to process documents.

Second document 135 may be a document in English. For example, based on first document 125 with text in the French language, "L'utilisateur entre informations de compte d'utilisateur non valides. Le système décrit les données saisies non valide et présente à l'utilisateur des suggestions," pseudo-code generating computing platform 110 may translate first document 125 to second document 135 with text in English, such as, for example, "User enters invalid user account information. The system describes which entered data was invalid and presents the user with suggestions."

In some embodiments, at step 3, summarization engine 112b may receive the second document 135 from translation engine 112a. For example, translation engine 112a may receive first document 125, translate it to generate second document 135, and send second document 135 to summarization engine 112b.

In some embodiments, pseudo-code generating computing platform 110 may generate an attention-based convolutional neural network (CNN) for the second document 135. Generally, a sequence-to-sequence model may be utilized, including an attention-based model. The attention-based model enables pseudo-code generating computing platform 110 to focus on aspects of first document 125 one at a time, with words, phrases, sentences, groups of sentences, and so forth, being assigned attention scores based on their relative significance. Attention may include local attention and global attention.

Figure 2:
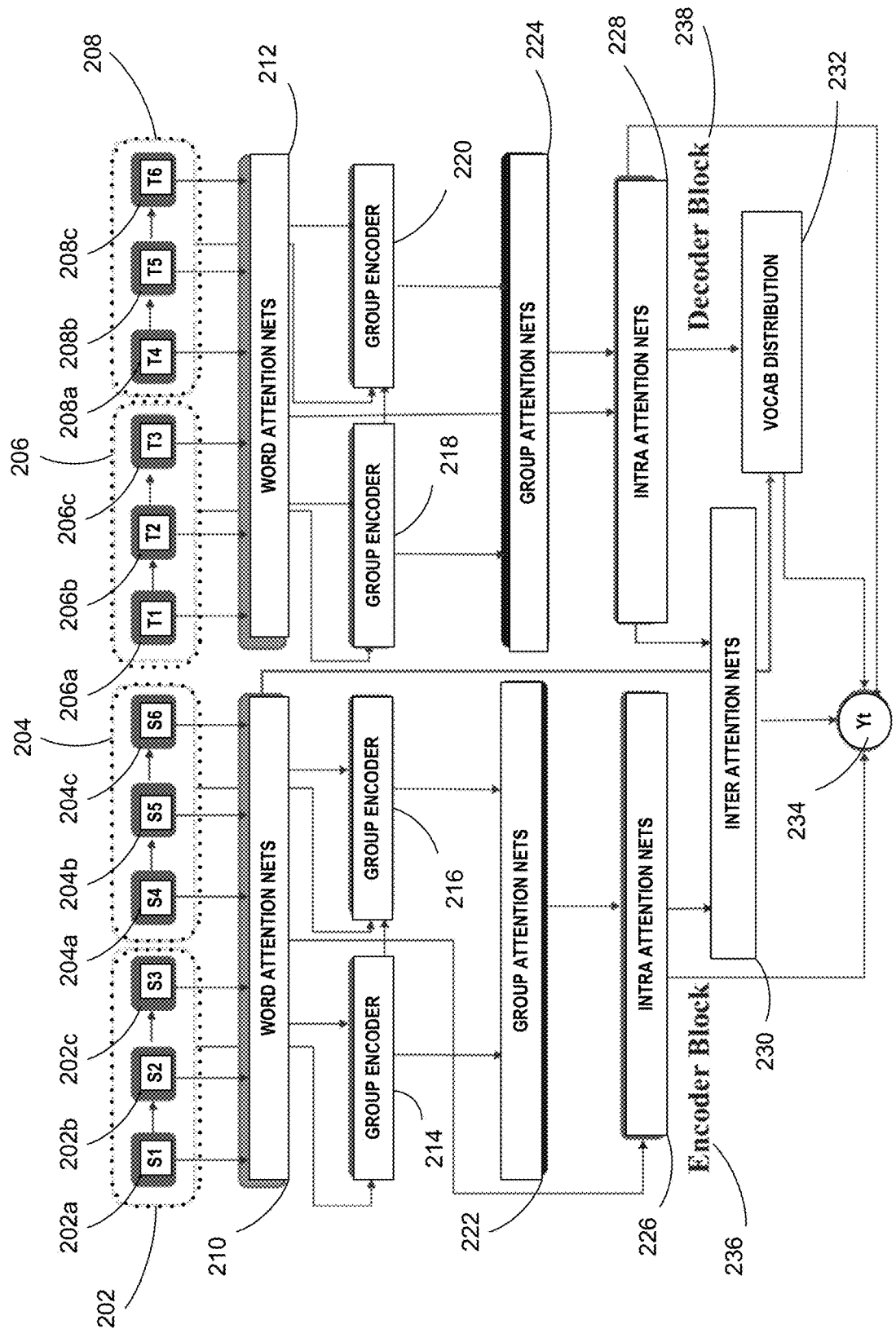
FIG. 2 depicts an illustrative architecture for an attention-based CNN.

FIG. 2 depicts an illustrative architecture for an attention-based CNN. Referring to FIG. 2, in some embodiments, pseudo-code generating computing platform 110 may include an encoder portion 236 and a decoder portion 238. In some embodiments, pseudo-code generating computing platform 110 may generate a word attention net including features of one or more words of an encoder portion. For example, the one or words may be 202a-c, 204a-c, 206a-c, and 208a-c. A first group 202 may include words 202a-c, a second group 204 may include words 204a-c, a third group 206 may include words 206a-c, and a fourth group 208 may include words 208a-c. In some embodiments, pseudo-code generating computing platform 110 may generate word attention nets 210 and 212. For example, word attention net 210 may include features of a first collection of words 202a-c, and 204a-c. As another example, word attention net 212 may include features of a second collection of words 206a-c, and 208a-c.

In some embodiments, pseudo-code generating computing platform 110 may determine a word-level attention score for a word of the group based on a word-level attention score for the group. For example, the word-level attention score of a j-th word ("wd") at a time t for the encoder portion 230 may be determined as:

$$a_{(t)j}^{wd} = \frac{\exp(s_{(t)j}^{e})}{\sum_{k=1}^{J} \exp(s_{(t)k}^{e})} \quad \text{(Eqn. 1)}$$

where $a_{(t)j}^{wd}$ is the word-level attention score of the j-th word at a time t, $S_{(t)j}^{e}$ is an intra-decoder attention score of the j-th word at a time t, for encoder portion 230.

Generally, the encoder portion 236 computes a representation (e.g., a context vector) for a sentence in first document 125, and the decoder portion 238 generates a translation of the sentence from this representation (e.g., the context vector), one word at a time. In some embodiments, pseudo-code generating computing platform 110 may generate group attention nets 222 and 224. Generally, a group attention net may include output of the word attention nets and group encoders, where the group encoder may include one or more groups, of words in the encoder portion 236 (respectively, decoder portion 238). For example, a first group attention net 222 may include output of a first group encoder 214 and a second group encoder 216. Also, for example, first group encoder 214 may include features of first group 202, and output of word attention net 210. In some instances, second group encoder 216 may include features of second group 204, output of word attention net 210, and first group encoder 214.

As another example, a second group attention net 224 may include output of a third group encoder 218 and a fourth group encoder 220. Also, for example, third group encoder 218 may include features of third group 206, and output of word attention net 212. In some instances, fourth group encoder 220 may include features of fourth group 208, output of word attention net 212, and third group encoder 218.

In some embodiments, pseudo-code generating computing platform 110 may determine a word-to-group-level attention score for a word of the first group based on a word-level attention score for the second group. For example, the word-to-group-level attention score between a j-th group, and an i-th word at a time t for the encoder portion 236 may be determined as:

$$a_{(t)i,j}^{wd} = \frac{\exp(s_{(t)i,j}^{wd})}{\sum_{k,l} \exp(s_{(t)k,l}^{wd})} \quad \text{(Eqn. 2)}$$

where $a_{(t)i,j}^{wd}$ is the word-to-group-level attention score between a j-th group, and an i-th word at a time t, and $S(t)_{i,j}^{wd}$ is an intra-decoder attention score between a j-th group, and an i-th word at a time t.

In some embodiments, pseudo-code generating computing platform 110 may determine a group-level attention score for a word of the group based on a group-level attention score for the group. For example, the group-level attention score for a j-th word of the group ("g") at a time t for the encoder portion 236 may be determined as:

$$a_{(t)j}^{g} = \frac{\exp(s_{(t)j}^{g})}{\sum_{l} \exp(s_{(t)l}^{g})} \quad \text{(Eqn. 3)}$$

where a(t)j$^g$ the group-level attention score for a j-th word of the group at a time t, $S_{(t)l}^{g}$ is an intra-decoder attention score of the l-th word at a time t.

Then, pseudo-code generating computing platform 110 may generate an intra attention net including outputs of word attention nets and group attention nets. For example, pseudo-code generating computing platform 110 may generate intra attention net 226 that may include outputs of word attention net 210 and group attention net 222. Also, for example, pseudo-code generating computing platform 110 may generate intra attention net 228 that may include outputs of word attention net 212, and group attention net 224.

In some embodiments, pseudo-code generating computing platform 110 may determine, an intra-attention score for a word of the group based on a group-level attention score for the word, and a word-to-group-level attention score for the word. For example, the intra-attention ("IAN") score between a j-th group, and an i-th word at a time t for the encoder portion 236 may be determined as:

$$a_{(t)i,j}^{IAN} = \frac{\exp(a_{(t)i}^{g} \cdot a_{(t)i,j}^{wd})}{\sum_{k,l} \exp(a_{(t)i}^{g} \cdot a_{(t)k,l}^{wd})} \quad \text{(Eqn. 4)}$$

where $a_{(t)i,j}^{IAN}$ is the intra-attention score between a j-th group, and an i-th word at a time t, $a_{(t)i}^{g}$ is the group-level attention score for a j-th word of the group at a time t, as determined, for example by Eqn. 3, and $a_{(t)i,j}^{wd}$ is the word-to-group-level attention score between a j-th group, and an i-th word at a time t, as determined, for example by Eqn. 2. Similarly, in some embodiments, pseudo-code generating computing platform 110 may determine, an intra-attention score for a word of the group for the decoder portion 238.

Subsequently, pseudo-code generating computing platform 110 may generate an inter attention net including outputs of, the intra attention net of the encoder portion and an intra attention net of the decoder portion. For example, pseudo-code generating computing platform 110 may generate inter attention net 230 that includes outputs of intra attention net 220 of the encoder portion 236, and intra attention net 228 of the decoder portion 238.

In some embodiments, pseudo-code generating computing platform 110 may generate a first context vector for the encoder portion based on a first weighted sum of first feature vectors for the encoder portion, where the first weights are based on intra-attention scores for words in the encoder portion. For example, the first context vector for the encoder portion 236 may be determined as:

$$z_{(t)}^{e} = \sum_{i,j} a_{(t)i,j}^{IAN} \cdot h_{ij}^{wd} \quad \text{(Eqn. 5)}$$

where $z_{(t)}^{e}$ is the first context vector for the encoder portion 236, $a_{(t)i,j}^{IAN}$ is the intra-attention score between a j-th group, and an i-th word at a time t, in the encoder portion 236, as determined, for example by Eqn. 4, and $h_{ij}^{wd}$ is a hidden state corresponding to the j-th group, and an i-th word in the encoder portion 236.

Subsequently, pseudo-code generating computing platform 110 may generate a second context vector for the decoder portion based on a second weighted sum of second feature vectors for the decoder portion, where the second weights are based on intra-attention scores for words in the decoder portion. For example, similar to Eqn. 5 (and the preceding equations), pseudo-code generating computing platform 110 may generate the second context vector $z_{(t)}^{d}$ for the decoder ("d") portion 238.

In some embodiments, pseudo-code generating computing platform 110 may determine an inter-attention score based on the first context vector and the second context vector. For example, the inter-attention ("IEA") score based on the first context vector $z_{(t)}^{e}$ (for encoder portion 236), and the second context vector $z_{(t)}^{d}$ (for decoder portion 238), may be determined as:

$$a_{(t)e,d}^{IEA} = \frac{z_{(t)}^{e} \cdot z_{(t)}^{d}}{\sum_{m} z_{(t)}^{e} \cdot z_{(t)}^{d}} \quad \text{(Eqn. 6)}$$

where m is a number of pairs of first context vectors and second context vectors.

In some embodiments, pseudo-code generating computing platform 110 may generate a vocabulary distribution based on word attention nets and intra attention nets. For example, pseudo-code generating computing platform 110 may generate vocabulary distribution 232 based on word attention nets 210, and intra attention nets 228. For example, vocabulary distribution 232, or a probability distribution of the vocabulary, may be based on forward or backward sequenced attention-based CNNs.

In some embodiments, pseudo-code generating computing platform 110 may determine an output of the attention-based CNN based on the vocabulary distribution, an inter-attention score, an intra-attention score for the encoder portion, and an inter-attention score for the decoder portion. For example, pseudo-code generating computing platform 110 may determine output 234, $\tilde{Y}_i$ of the attention-based CNN as:

$$\tilde{Y}_i : a_{(t)i,j}^{IANe} \oplus a_{(t)i,j}^{IANd} \oplus V \oplus a_{(t)e,d}^{IEA} \quad \text{(Eqn. 7)}$$

where $a_{(t)i,j}^{IANe}$ is the intra-attention score between a j-th group, and an i-th word at a time t, for encoder portion 236, as determined, for example, by Eqn. 4, $a_{(t)i,j}^{IANd}$ is an intra-attention score between a j-th group, and an i-th word at a time t, for decoder portion 238, as may be determined, for example, by an equation analogous to Eqn. 4 for the decoder portion 238, V is the vocabulary distribution, and $a_{(t)e,d}^{IEA}$ is the inter-attention score, as determined, for example, by Eqn. 6.

It may be noted that a number, and composition of, words, groups, group encoders, word attention nets, group attention nets, intra attention nets, inter attention nets, and so forth, in FIG. 2, are shown for illustrative purposes only. Generally, there may be many combinations of such components, and inter-relationships. Also, for example, although words are shown to form a group, it may be noted that groups may be combined to determine a group of groups, a group of a group of groups, and so forth for various hierarchical combinations. For example, a paragraph may comprise four sentences. Accordingly, a group may be forms including one or more words of a sentence. Also, for example, a sentence itself may be a group. As another example, two sentences may comprise a group. As another example, the paragraph itself may be a group. Also, for example, word attention nets 210, and/or word attention nets 212, may comprise a plurality of word attention nets. As another example, first group 202 may comprise words S1 202a, S2 202b, S3 202c, and second group 204 may comprise words S4 204a, S5 204b, S6 204c In some embodiments, first group 202 and second group 204 may share common words. For example, first group 202 may comprise words S1 202a, S2 202b, S3 202c, S4 204a, and second group 204 may comprise words S4 204a, S5 204b, S6 204c. Additional, and/or alternative combinations of words may comprise groups.

Also, for example, group attention nets 222, and/or group attention nets 224, may comprise a plurality of group attention nets. Similarly, intra attention nets 226, and/or intra attention nets 228, may comprise a plurality of intra attention nets. Accordingly, inter attention nets 230 may be based on a plurality of intra attention nets 226, and/or intra attention nets 228. Also, for example, although FIG. 2 illustrates a forward attention net, additional and/or alternate versions of attention nets may be utilized. It may be noted that although an embodiment of a sequential flow of the architecture of the attention-based CNN is illustrated in FIG. 2, this is for illustrative purposes. Generally, one or more of the components may operate in parallel. For example, pseudo-code generating computing platform 110 may determine word attention nets 210 and group encoder 218 in parallel. As another example, pseudo-code generating computing platform 110 may determine word attention nets 210 and group attention nets 224 in parallel.

Referring to FIG. 1B, at step 4, pseudo-code generating computing platform 110 may extract, by applying the attention-based CNN, an abstractive summary 145 of the second document 135. Generally, the term "abstractive summary" as used herein, may refer to a summary of actionable steps to be performed. For example, in a login functionality, actionable steps may include steps, such as, for example, receiving a username and a password, validation the combination of the username and the password. In some instances, the validation may be based on a 2-factor authentication. Subsequent to a successful validation, providing the secure resources to the user. Accordingly, pseudo-code generating computing platform 110 may extract the abstractive summary by determining the actionable steps. In some instances, verbs and/or adverbs may be identified, and words associated with the verbs and/or adverbs may be analyzed for actionable steps.

Extracting the abstractive summary of a document is generally a technically challenging problem. Accordingly, the attention-based CNN, as described herein, is of great significance to extracting the abstractive summary. For example, as described herein, the attention-based CNN may determine contextual importance of words and/or phrases. In generating group attention nets, intra attention nets, and inter attention nets, and scores for words corresponding to the various nets, pseudo-code generating computing platform 110 may determine a relative contextual importance of words and/or phrases. In some embodiments, pseudo-code generating computing platform 110 may utilize one or more of word-level attention scores (as determined in Eqn. 1), word-to-group-level attention scores (as determined in Eqn. 2), group-level attention scores (as determined in Eqn. 3), intra-attention scores (as determined in Eqn. 4), inter-attention scores (as determined in Eqn. 6), a vocabulary distribution, and so forth, to extract the abstractive summary 145.

For example, the abstractive summary 145 may be a paraphrase of the contents of second document 135. In some embodiments, the abstractive summary 145 may include a sequence of steps. For example, abstractive summary 145 may include a sequence of steps, such as, for example, a first step "1. The User enters the required User Account information values," a second step "2. The system validates the entered User Account information," a third step "3. The values of the User Account information are stored in the User's account," and a fourth step "4. The system notifies the User that the account has been created."

In some embodiments, pseudo-code generating computing platform 110 may extract the abstractive summary by analyzing one or more of: repetitions of words and out-of-vocabulary words. For example, for first document 125 comprising text in French, pseudo-code generating computing platform 110 may determine repetitive words, such as, for example, "utilisateur," "non," "valide," and so forth. Accordingly, pseudo-code generating computing platform 110 may determine that "utilisateur," "non," "valide," may be significant to extract the abstractive summary. In some embodiments, repetitive words, such one "I", "You", "the", and so forth, may be determined to be not significant for a process to extract the abstractive summary.

Language is evolving, and new words may be added to a language. Out-of-vocabulary ("OOV") words may generally refer to words that are not recognized as existing words in a language. In some embodiments, pseudo-code generating computing platform 110 may ignore OOV words. Also, for example, pseudo-code generating computing platform 110 may determine if an OOV word affects a sentiment of a collection of words and/or groups. Based on a determination that the OOV word does not affect the sentiment of a collection of words and/or groups, pseudo-code generating computing platform 110 may ignore the OOV word. As another example, based on a determination that the OOV word affects the sentiment of a collection of words and/or groups, pseudo-code generating computing platform 110 may include the OOV word in an analysis. In some embodiments, pseudo-code generating computing platform 110 may utilize a Long Short Term Memory ("LSTM") network to determine an embedding for an 00V word.

In some embodiments, at step 5, flowchart generation engine 112c may receive the abstractive summary 145 from summarization engine 112b. For example, summarization engine 112b may extract abstractive summary 145 from second document 135, and provide abstractive summary 145 to flowchart generation engine 112c.

At step 6, pseudo-code generating computing platform 110 may generate, based on the abstractive summary 145, a flowchart 155. Generally, a flowchart is a diagram comprising blocks, and connectors (arrows, lines, and so forth) between one or more of the blocks. The arrows may be unidirectional, and/or bidirectional. In some embodiments, flowchart 155 may comprise blocks that may represent a document, a tagged document, an input/output ("I/O"), a manual operation, a divided process, a multi-document, a database, a data transmission, and so forth. Also, for example, flowchart 155 may comprise blocks that may represent a process, a decision, a subprocess, a start, an end, data, and so forth.

In some embodiments, an image generation model may be utilized to generate flowchart 155. For example, a LSTM model may be utilized. An LSTM model is a type of Recurrent Neural Network ("RNN") that may be configured to learn long-term dependencies between objects and/or components. In some embodiments, LSTM may be configured to train on an attention-based CNN, as disclosed herein.

For example, pseudo-code generating computing platform 110 may determine a start and an end, and may generate a block "Start" and a block "End." As another example, first step "1. The User enters the required User Account information values," from abstractive summary 145, may be utilized to generate block labeled "1000," where the block indicates a step "Receive information to create account." An arrow from "Start" to block labeled "1000," indicates the flow for the flowchart.

Also, for example, second step "2. The system validates the entered User Account information," from abstractive summary 145, may be utilized to generate a decision block labeled "1010," where the block indicates a determining step "Is information correct?" An arrow from block labeled "1000," to block labeled "1010," indicates the flow for the flowchart. As arrow labeled "No" indicates, upon a determination, at step 1010, that the information is not correct, the process may return to the step performed at block labeled "1000." As arrow labeled "Yes" indicates, upon a determination, at step 1010, that the information is correct, the process may proceed to the step performed at block labeled "1020."

For example, third step "3. The values of the User Account information are stored in the User's account," from abstractive summary 145, may be utilized to generate a decision block labeled "1020," where the block indicates a step "Store values in a database." Similarly, fourth step "4. The system notifies the User that the account has been created," from abstractive summary 145, may be utilized to generate a block labeled "1030," where the block indicates a step "Notify user that account has been created." Upon a determination that steps and/or inter-relationships between steps, in abstractive summary 145 have been utilized to generate flowchart 155, pseudo-code generating computing platform 110 may determine that the process may terminate. Accordingly, an arrow from block labeled "1030," to the block "End" may indicate that the process may terminate after the step performed at block labeled "1030."

It may be noted that one or more steps of abstractive summary 145 may be omitted to generate flowchart 155. Also, for example, pseudo-code generating computing platform 110 may add one or more steps, and/or connectors to generate flowchart 155. For example, abstractive summary 145 does not include a recurring step to receive the information to create the account. However, pseudo-code generating computing platform 110 may determine, for example, based on a trained machine learning model, and/or based on historical data, that the process may return from decision block labeled "1010" to block labeled "1000," and indicate the recurrent step with an arrow labeled "No" from decision block labeled "1010" to block labeled "1000."

In some embodiments, pseudo-code generating computing platform 110 may convert, based on a cascade image generation model, the abstractive summary 145 to the flowchart 155. For example, the cascade image generation model may be based on ensemble learning where a plurality of classifier models may be arranged together, so that an output of one classifier model is an input to the next classifier model. Accordingly, pseudo-code generating computing platform 110 may scan a first version of a flowchart to detect blocks and/or connectors, and iteratively updated and/or validate the flowchart. In some embodiments, pseudo-code generating computing platform 110 may refer to abstractive summary 145 to validate one or more of the blocks and/or connectors in a version of flowchart 155. For example, pseudo-code generating computing platform 110 may determine a first threshold for an initial iteration of an application of the cascade image generation model, and adjust the second threshold for the next iteration, so as to increase an accuracy. In some embodiments, accuracy may be determined bad on a relative number of true positives and false positives, and pseudo-code generating computing platform 110 may apply the cascade image generation model until a number of true positives is within a prescribed threshold of 100%. In some embodiments, pseudo-code generating computing platform 110 may train the cascade image generation model. For example, pseudo-code generating computing platform 110 may train the one or more classifiers that comprise the cascade image generation model. As another example, pseudo-code generating computing platform 110 may train the cascade image generation model to determine a sequence for the classifiers, and/or more to determine one or more of the thresholds. In some embodiments, pseudo-code generating computing platform 110 may train the cascade image generation model to adjust a number of true positives based on a complexity of abstractive summary 145, and/or flowchart 155. For example, the prescribed threshold of 100% may be higher for a flowchart with a large number of different types of block to allow for a larger margin of error. Also, for example, the prescribed threshold of 100% may be lower for a flowchart with a smaller number of different types of block to allow for a lower margin of error.

In some embodiments, at step 7, pseudo-code generation engine 112d may receive the flowchart 155 from flowchart generation engine 112c. For example, flowchart generation engine 112c may generate flowchart 155 from abstractive summary 145, and store flowchart 155 in a database (e.g., enterprise data storage platform 120). Accordingly, pseudo-code generation engine 112d may retrieve flowchart 155 from the database (e.g., enterprise data storage platform 120).

At step 8, pseudo-code generating computing platform 110 may generate, based on the flowchart, a pseudo-code 165. The term "pseudo-code" generally refers to a computer code indicative of an overall description of a computer program. In some embodiments, a pseudo-code may not depend on a particular formal language, and/or computing environment. Also, for example, a pseudo-code may not be compiled into an executable program. In some embodiments, pseudo-code 165 may include structured elements such as, for example, sequence, while, do, for, if, if-then, if-then-else, repeat, count, and so forth.

In some embodiments, pseudo-code generating computing platform 110 may generate, based on a natural language generation model, the pseudo-code 165 in a programming language associated with a domain. For example, pseudo-code generating computing platform 110 may generate pseudo-code 165 from flowchart 155 by applying rule based conversions, with structures and/or elements in pseudo-code 165 corresponding to a formal language. For example, pseudo-code generating computing platform 110 may train a natural language generation model to generate pseudo-code 165 in a programming language. Generally, a natural language generation ("NLG") model is a process that may convert structured data, such as a flowchart, to a natural language.

In some embodiments, pseudo-code generating computing platform 110 may display, via an interactive graphical user interface, the flowchart 155, and the pseudo-code 165. For example, the interactive graphical user interface may provide flowchart 155, and/or pseudo-code 165. In some embodiments, pseudo-code generating computing platform 110 may provide first document 125, translated or second document 130, abstractive summary 145, and so forth. In some embodiments, pseudo-code generating computing platform 110 may receive, via the graphical user interface, an indication of a change to one or more of the flowchart and the pseudo-code. For example, a subject matter expert may review first document 125, translated or second document 135, abstractive summary 145, flowchart 155, and/or pseudo-code 165, and may make changes, and/or edits to one or more of translated or second document 135, abstractive summary 145, flowchart 155, and/or pseudo-code 165.

In some embodiments, pseudo-code generating computing platform 110 may train, based on the indication, a machine learning model to perform one or more of the: translating the document, generating the attention-based CNN, extracting the abstractive summary, generating the flowchart, and generating the pseudo-code. For example, inputs by the subject matter expert to flowchart 155, and/or pseudo-code 165, may be considered as labeled data that may be utilized to train the machine learning model. In some embodiments, the neural machine translation model (e.g., BERT) may be trained based on the indication. Also, for example, an architecture for attention-based CNN may be modified and/or updated. For example, one or more inter-attention nets, and/or intra-attention nets may be added or deleted. As another example, the image generation model (e.g., LSTM) may be trained.

Figure 3:
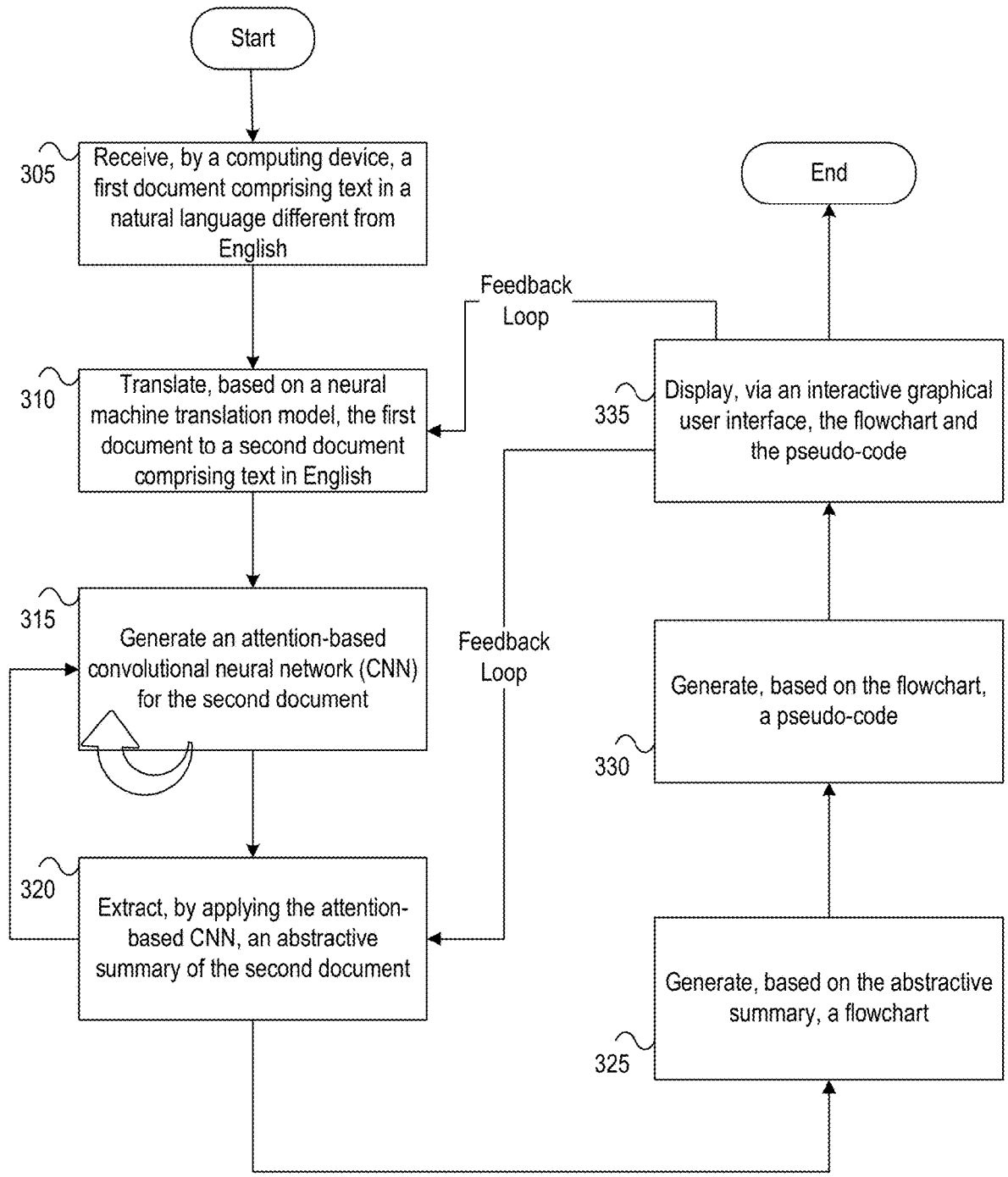
FIG. 3 depicts an illustrative method for generating a pseudo-code from a text summarization based on a convolutional neural network.

FIG. 3 depicts an illustrative method for generating a pseudo-code from a text summarization based on a convolutional neural network. Referring to FIG. 3, at step 305, a pseudo-code generating computing platform 110, having at least one processor, and memory storing computer-readable instructions that, when executed by the at least one processor, cause pseudo-code generating computing platform 110 to receive, by a computing device, first document including text in a natural language different from English. At step 310, pseudo-code generating computing platform 110 may translate, based on a neural machine translation model, the first document to a second document including text in English. At step 315, pseudo-code generating computing platform 110 may generate an attention-based convolutional neural network (CNN) for the second document. As described with respect to FIG. 2, this process may include several iterations. At step 320, pseudo-code generating computing platform 110 may extract, by applying the attention-based CNN, an abstractive summary of the second document. In some embodiments, the abstractive summary may be generated one word at a time, based on repeated applications of the process at step 315.

At step 325, pseudo-code generating computing platform 110 may generate, based on the abstractive summary, a flowchart. At step 330, pseudo-code generating computing platform 110 may generate, based on the flowchart, a pseudo-code. At step 335, pseudo-code generating computing platform 110 may display, via an interactive graphical user interface, the flowchart, and the pseudo-code. In some embodiments, the process may return to step 310 to modify the second document. In some embodiments, the process may return to step 320 to modify the abstractive summary.

Figure 4:
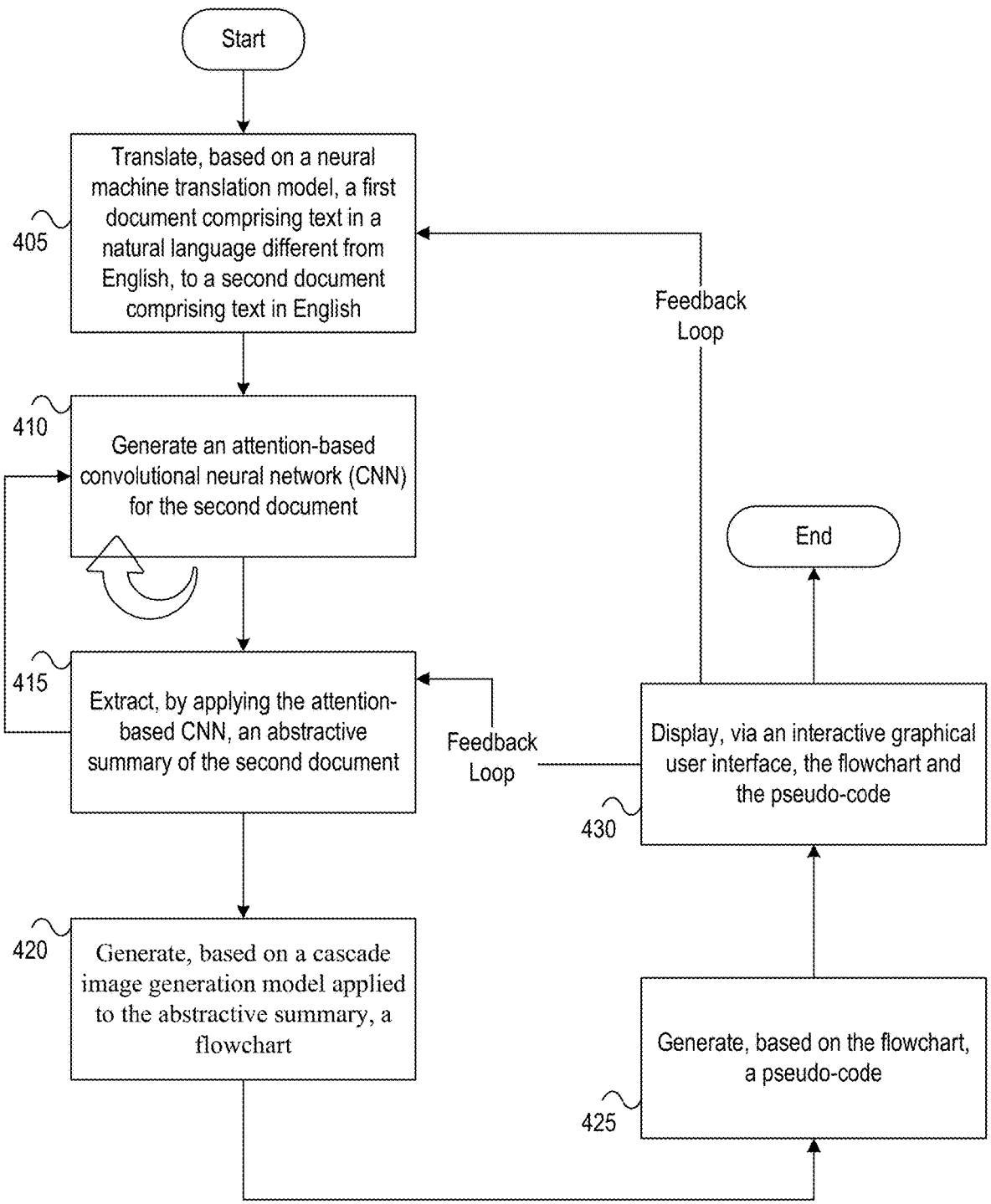
FIG. 4 depicts another illustrative method for generating a pseudo-code from a text summarization based on a convolutional neural network.

FIG. 4 depicts another illustrative method for generating a pseudo-code from a text summarization based on a convolutional neural network. Referring to FIG. 4, at step 405, a pseudo-code generating computing platform 110, having at least one processor, and memory storing computer-readable instructions that, when executed by the at least one processor, cause pseudo-code generating computing platform 110 to translate, based on a neural machine translation model, a first document including text in a natural language different from English, to a second document including text in English. At step 410, pseudo-code generating computing platform 110 may generate an attention-based convolutional neural network (CNN) for the second document. As described with respect to FIG. 2, this process may include several iterations. At step 415, pseudo-code generating computing platform 110 may extract, by applying the attention-based CNN, an abstractive summary of the second document. In some embodiments, the abstractive summary may be generated one word at a time, based on repeated applications of the process at step 410. At step 420, pseudo-code generating computing platform 110 may generate, based on a cascade image generation model applied to the abstractive summary, a flowchart.

At step 425, pseudo-code generating computing platform 110 may generate, based on the flowchart, a pseudo-code. At step 430, pseudo-code generating computing platform 110 may display, via an interactive graphical user interface, the flowchart, and the pseudo-code. In some embodiments, the process may return to step 405 to update the neural machine translation model. In some embodiments, the process may return to step 415 to update the attention-based convolutional neural network (CNN).

Figure 5:
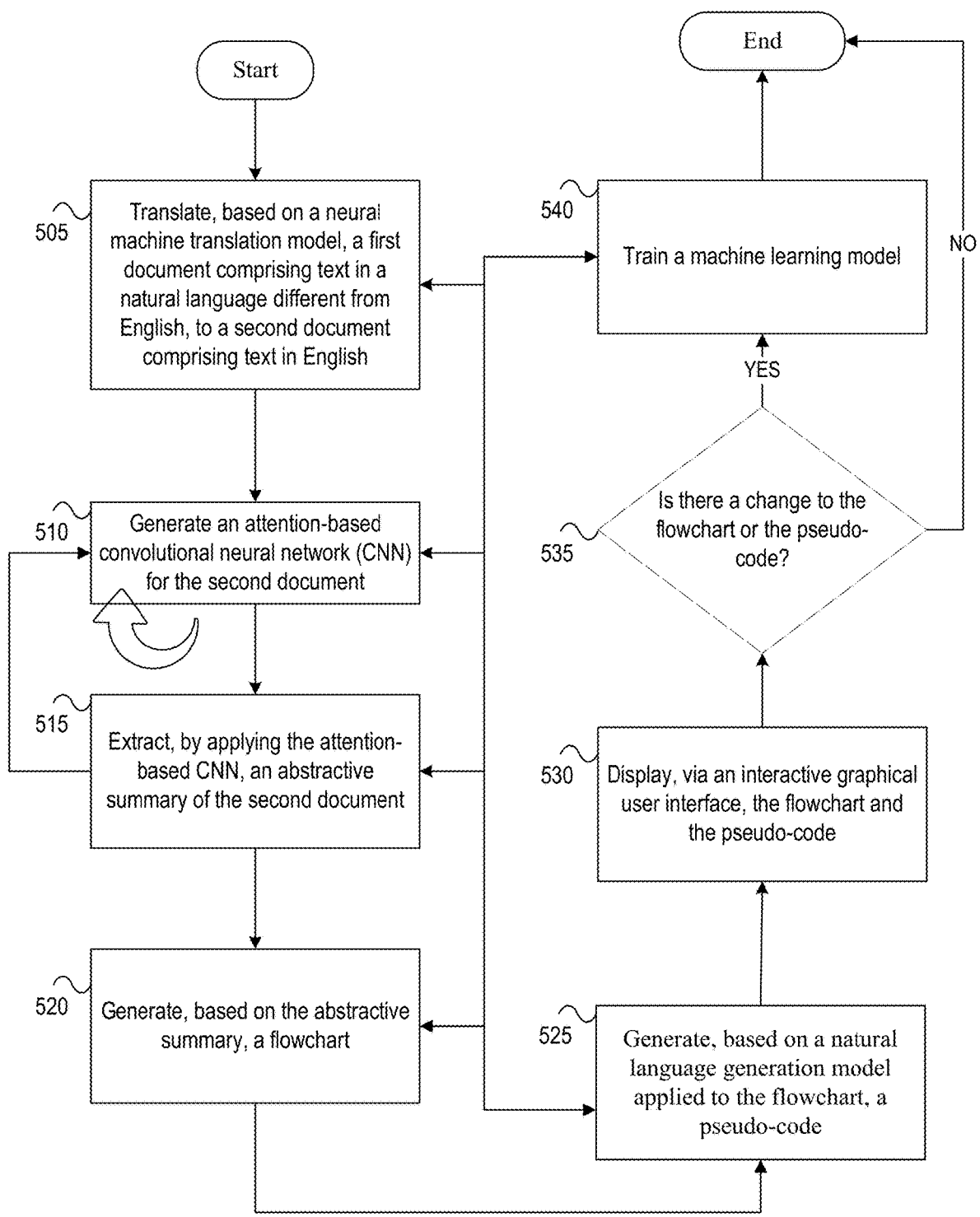
FIG. 5 depicts another illustrative method for generating a pseudo-code from a text summarization based on a convolutional neural network.

FIG. 5 depicts another illustrative method for generating a pseudo-code from a text summarization based on a convolutional neural network. Referring to FIG. 5, at step 505, a pseudo-code generating computing platform 110, having at least one processor, and memory storing computer-readable instructions that, when executed by the at least one processor, cause pseudo-code generating computing platform 110 to translate, based on a neural machine translation model, a first document including text in a natural language different from English, to a second document including text in English. At step 510, pseudo-code generating computing platform 110 may generate an attention-based convolutional neural network (CNN) for the second document. As described with respect to FIG. 2, this process may include several iterations. At step 515, pseudo-code generating computing platform 110 may extract, by applying the attention-based CNN, an abstractive summary of the second document. In some embodiments, the abstractive summary may be generated one word at a time, based on repeated applications of the process at step 510. At step 520, pseudo-code generating computing platform 110 may generate, based on the abstractive summary, a flowchart. At step 525, pseudo-code generating computing platform 110 may generate, based on a natural language generation model applied to the flowchart, a pseudo-code.

At step 530, pseudo-code generating computing platform 110 may display, via an interactive graphical user interface, the flowchart and the pseudo-code. At step 535, pseudo-code generating computing platform 110 may determine whether an indication of a change to one or more of the flowchart and the pseudo-code is received. Upon a determination that an indication of a change to one or more of the flowchart and the pseudo-code is received, the process may move to step 540. At step 540, pseudo-code generating computing platform 110 may train, based on the indication, a machine learning model to perform one or more of the: translating the document, generating the attention-based CNN, extracting the abstractive summary, generating the flowchart, and generating the pseudo-code. In some embodiments, the process may return to one or more of steps 505-525 to receive apply the trained machine learning model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   receive, by a computing device, a first document comprising text in a natural language different from English;
   translate, based on a neural machine translation model, the first document to a second document comprising text in English;
   generate an attention-based convolutional neural network (CNN) for the second document, wherein the attention-based CNN comprises an encoder portion and a decoder portion;
   generate a first context vector for the encoder portion based on a first weighted sum of first feature vectors for the encoder portion, wherein first weights are based on intra-attention scores for words in the encoder portion; and
   generate a second context vector for the decoder portion based on a second weighted sum of second feature vectors for the decoder portion, wherein second weights are based on intra-attention scores for words in the decoder portion;
   extract, by applying the attention-based CNN, an abstractive summary of the second document;
   generate, based on the abstractive summary, a flowchart;
   generate, based on the flowchart, a pseudo-code; and
   display, via an interactive graphical user interface, the flowchart, and the pseudo-code.

2. The computing platform of claim 1, wherein the instructions to generate the flowchart comprise additional computer-readable instructions that, when executed by the at least one processor, cause the computing platform to:
   convert, based on a cascade image generation model, the abstractive summary to the flowchart.

3. The computing platform of claim 1, wherein the instructions to generate the pseudo-code comprise additional computer-readable instructions that, when executed by the at least one processor, cause the computing platform to:
   generate, based on a natural language generation model, the pseudo-code in a programming language associated with a domain.

4. The computing platform of claim 1, wherein the instructions to generate the attention-based CNN comprise additional computer-readable instructions that, when executed by the at least one processor, cause the computing platform to:
   generate a word attention net comprising features of one or more words of the encoder portion;
   generate a group attention net comprising output of the word attention net and one or more group encoders, wherein the group encoder comprises one or more groups of the one or more words;
   generate an intra attention net, of the encoder portion, comprising outputs of word attention nets and group attention nets; and
   generate an inter attention net comprising outputs of the intra attention net of the encoder portion, and an intra attention net of the decoder portion.

5. The computing platform of claim 1, wherein the attention-based CNN further comprises a group of words in the encoder portion, and wherein the instructions comprise additional computer-readable instructions that, when executed by the at least one processor, cause the computing platform to:

determine a word-level attention score for a word of the group of words based on a word-level attention score for the group of words.

6. The computing platform of claim 1, wherein the attention-based CNN further comprises a first group of words and a second group of words in the encoder portion, and wherein the instructions comprise additional computer-readable instructions that, when executed by the at least one processor, cause the computing platform to:
determine a word-to-group-level attention score for a word of the first group of words based on a word-level attention score for the second group of words.

7. The computing platform of claim 1, wherein the attention-based CNN further comprises a group of words in the encoder portion, and wherein the instructions comprise additional computer-readable instructions that, when executed by the at least one processor, cause the computing platform to:
determine a group-level attention score for a word of the group of words based on a group-level attention score for the group of words.

8. The computing platform of claim 1, wherein the attention-based CNN further comprises a group of words in the encoder portion, a group attention net comprising output of one or more group encoders, a word attention net comprising features of words in the group of words in the encoder portion, and an intra attention net comprising outputs of word attention nets and group attention nets, and wherein the instructions comprise additional computer-readable instructions that, when executed by the at least one processor, cause the computing platform to:
determine an intra-attention score for a word of the group of words based on a group-level attention score for the word, and a word-to-group-level attention score for the word.

9. The computing platform of claim 1, wherein the attention-based CNN comprises an inter-attention net comprising one or more intra-attention nets, and wherein the instructions comprise additional computer-readable instructions that, when executed by the at least one processor, cause the computing platform to:
determine an inter-attention score based on the first context vector and the second context vector.

10. The computing platform of claim 1, wherein the instructions comprise additional computer-readable instructions that, when executed by the at least one processor, cause the computing platform to:
generate a vocabulary distribution based on word attention nets and intra attention nets.

11. The computing platform of claim 1, wherein the attention-based CNN further comprises an inter-attention net comprising one or more intra-attention nets, and wherein the instructions comprise additional computer-readable instructions that, when executed by the at least one processor, cause the computing platform to:
determine an output of the attention-based CNN based on a vocabulary distribution, an inter-attention score, an intra-attention score for the encoder portion, and an inter-attention score for the decoder portion.

12. The computing platform of claim 1, wherein the instructions to extract the abstractive summary comprise additional computer-readable instructions that, when executed by the at least one processor, cause the computing platform to:
analyze one or more of: repetitions of words and out-of-vocabulary words.

13. The computing platform of claim 1, wherein the instructions to translate the first document comprise additional computer-readable instructions that, when executed by the at least one processor, cause the computing platform to:
train the neural machine translation model.

14. The computing platform of claim 1, wherein the instructions to generate the flowchart comprise additional computer-readable instructions that, when executed by the at least one processor, cause the computing platform to:
train a cascade image generation model.

15. The computing platform of claim 1, wherein the instructions to generate the pseudo-code comprise additional computer-readable instructions that, when executed by the at least one processor, cause the computing platform to:
train a natural language generation model.

16. A method, comprising:
at a computing platform comprising at least one processor, and memory:
translating, based on a neural machine translation model, a first document comprising text in a natural language different from English, to a second document comprising text in English;
generating an attention-based convolutional neural network (CNN) for the second document;
generating an intra attention net, of an encoder portion, comprising word attention nets outputs comprising features of one or more words of the encoder portion, and group attention nets comprising outputs of one or more group encoders;
generating an inter attention net comprising outputs of the intra attention net of the encoder portion, and an intra attention net of a decoder portion;
generating a first context vector for the encoder portion based on the intra attention net of the encoder portion;
generating a second context vector for the decoder portion based on the intra attention net of the decoder portion; and
determining an inter-attention score based on the first context vector and the second context vector;
extracting, by applying the attention-based CNN, an abstractive summary of the second document;
generating, based on a cascade image generation model applied to the abstractive summary, a flowchart;
generating, based on the flowchart, a pseudo-code; and
displaying, via an interactive graphical user interface, the flowchart, and the pseudo-code.

17. The method of claim 16, wherein the inter-attention net comprises one or more intra-attention nets, and further comprising:
determining an output of the attention-based CNN based on a vocabulary distribution, an inter-attention score, an intra-attention score for the encoder portion, and an inter-attention score for the decoder portion.

18. One or more non-transitory computer-readable media storing instructions that, when executed by a computing platform comprising at least one processor, and memory, cause the computing platform to:
translate, based on a neural machine translation model, a first document comprising text in a natural language different from English, to a second document comprising text in English;
generate an attention-based convolutional neural network (CNN) for the second document, wherein the attention-based CNN comprises an encoder portion and a decoder portion;

generate a first context vector for the encoder portion based on a first weighted sum of first feature vectors for the encoder portion, wherein first weights are based on intra-attention scores for words in the encoder portion; and
generate a second context vector for the decoder portion based on a second weighted sum of second feature vectors for the decoder portion, wherein second weights are based on intra-attention scores for words in the decoder portion;
extract, by applying the attention-based CNN, an abstractive summary of the second document;
generate, based on the abstractive summary, a flowchart;
generate, based on a natural language generation model applied to the flowchart, a pseudo-code; and
display, via an interactive graphical user interface, the flowchart and the pseudo-code;
receive, via the graphical user interface, an indication of a change to one or more of the flowchart and the pseudo-code; and
train, based on the indication, a machine learning model to perform one or more of the: translating the first document, generating the attention-based CNN, extracting the abstractive summary, generating the flowchart, and generating the pseudo-code.

* * * * *